(12) United States Patent
Cargemel et al.

(10) Patent No.: US 6,295,609 B1
(45) Date of Patent: Sep. 25, 2001

(54) PROTECTION AGAINST ELECTRICAL FAULTS IN A MASS MEMORY DATA STORAGE SYSTEM

(75) Inventors: Laurent Cargemel, Avrillé; Daniel Carteau, Montigny le Bretonneux; Michaud Gilbert, Maule, all of (FR)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 09/196,238

(22) Filed: Nov. 20, 1998

(30) Foreign Application Priority Data

Nov. 20, 1997 (FR) .................................................. 97 14580

(51) Int. Cl.[7] .................................................. G06F 11/00
(52) U.S. Cl. .................................................. 714/6; 711/114
(58) Field of Search ................ 714/6, 7, 11–13, 714/25, 27, 39, 41, 42, 43, 44, 2, 5; 711/112, 114, 115

(56) References Cited

U.S. PATENT DOCUMENTS

| 4,654,857 | * | 3/1987 | Samson et al. | 371/68 |
| 5,077,736 | * | 12/1991 | Dunphy, Jr. et al. | 371/10.1 |
| 5,134,619 | * | 7/1992 | Henson et al. | 371/40.1 |
| 5,325,363 | * | 6/1994 | Lui | 371/8.1 |
| 5,479,653 | * | 12/1995 | Jones | 395/182.03 |
| 5,500,940 | * | 3/1996 | Skeie | 395/183.01 |
| 5,502,728 | * | 3/1996 | Smith, III | 395/182.03 |
| 5,566,316 | * | 10/1996 | Fechner et al. | 395/441 |
| 5,655,150 | * | 8/1997 | Matsumoto et al. | 395/837 |
| 5,848,230 | * | 12/1998 | Walker | 395/182.05 |
| 5,943,287 | * | 8/1999 | Walton | 365/230.03 |

FOREIGN PATENT DOCUMENTS 0632558   1/1995   (EP) .

* cited by examiner

*Primary Examiner*—Nadeem Iqbal
(74) *Attorney, Agent, or Firm*—Miles & Stockbridge P.C.; Edward J. Kondracki

(57) ABSTRACT

A multidisk storage system (SD) equipped with a redundancy mechanism comprises at least two disk units (UND1–UND3), at least one redundancy control unit (UNC1–UNC2), a power distribution point (P), and a control unit (EG1–EG5), located in proximity to the point (P), for triggering the opening of the corresponding line (LI1–LI5) in case of an electrical fault in the associated unit and in the line itself. This system therefore ensures an optimal protection against electrical faults and ensures an optimal availability of the data.

22 Claims, 2 Drawing Sheets

PROTECTION AGAINST ELECTRICAL FAULTS IN A MASS MEMORY DATA STORAGE SYSTEM

CROSS-REFERENCE TO RELATED APPLICATIONS

The subject matter of this application is related to the subject matter of the following U.S. patents:

U.S. Pat. No. 5,225,967—Carteau—"Information Processing System Architecture Including Two Buses";

U.S. Pat. No. 5,283,879—Carteau and Schreck—"Protected Method For Fast Working of Data For Mass Memory Apparatus";

U.S. Pat. No. 5,325,488—Carteau, Schreck and Giacomin—"Peripheral Mass Memory System Having Identical Controllers Connected to Two Parallel Buses For Accessing Disk Memory Banks, Solid State Disks and Cache Memories";

U.S. Pat. No. 5,386,535—Carteau—"Protected Electronic Mass Memory Unit";

5,506,750—Carteau—"Mass Memory Subsystem Having Plates With Pluralities of Disk Drives Connected to Central Electronic Cards".

TECHNICAL FIELD

The invention relates to the protection of a mass memory data storage system. The storage system can be of any type. The system can be, among other things, a multidisk system comprising units. These units can be mass storage units. The mass storage units used as examples in the text below are magnetic disk storage units. The invention is particularly suited to systems equipped with a data storage redundancy mechanism. These systems are advantageous in that they provide a high availability of the data. High availability is generally defined as being the time, measured in minutes, in hours or in days per year, during which access to all of the data stored in the disk storage units is unavailable.

The subjects of the invention are a protection process and device as well as a data storage system equipped with such a device.

PRIOR ART

A multidisk system is generally contained in a cabinet. One type of cabinet is described, for example, in the patent EP-A-0621600 corresponding to U.S. Pat. No. 5,506,750. It specifically comprises drawers in which magnetic disk storage units are housed. Each unit comprises magnetic disks that are connected to one another. Thus, when one of the disks is offline, the others continue to function.

The system is equipped with a redundant data storage mechanism. For this reason, at least one of the drawers can be designated to receive a redundancy control unit. This redundancy control unit can be a controller of the RAID type (Redundant Array of Inexpensive Disks) or an adapter that allows optimal availability of the data stored on the magnetic disks. RAID type controllers are classified according to standardized numbers representing different modes of redundancy. For example, the RAID-1 type of redundancy uses mirrored disks. According to this mechanism, the data are stored on a first disk of one unit and redundantly on a second disk of another unit. The second disk is physically distinct from the first, and represents the mirror of the first. Thus, when a disk is no longer accessible, the data can be read- and/or write-accessed from its mirrored disk. The mirrored disks are located in separate units in order to provide high availability. According to the RAID-5 type of redundancy, the data are divided into segments of several blocks of predetermined length, which are called usable data blocks. A predetermined number of segments is associated with a redundant segment, which is composed of parity blocks and is located in another disk associated with another drawer. This mechanism also uses a plurality physical disks, each located in a different drawer. The data can be read- and/or write-accessed even if a disk unit is not available.

A redundancy mechanism requires that the disk units be independent of one another in terms of the writing and reading of data. The data stored on a disk must remain available at all times. Likewise, the writing of data onto a disk must be possible. The existing data paths between controllers and units must be independent. Each unit is connected to the controllers by means of a separate cable. This cable specifically comprises a data bus which represents the data path, the disk control lines, etc.

However, the one and only dependency existing between the disk units and the controller(s) or adapter(s) is the power supply. In other words, each disk unit, controller or adapter is connected to the same power distribution point.

The problem arises when an electrical fault, such as a short circuit, occurs in the system. This short circuit can have various sources. For example, a malfunction of a disk or a controller, or an error on the part of an operator, can unintentionally create a short circuit while operating the system. Thus, a short circuit can be produced in a unit, and can cause an excessively intense fault current. This current is propagated, and as it travels, it can destroy all of the electrical or electronic hardware (components, cables, etc.) located on the same electrical line. This is known as fault propagation. All the lines converge toward a main electric power source. Consequently, the power source, which is protected, cuts off and the system is no longer supplied with power. It becomes totally unavailable. The reading or writing of data, on the disks of the unit that initially failed as well as in the units that contain the redundancy disks, is impossible. Therefore, the consequences of this fault current are serious in terms of the availability of the data.

A solution of the prior art, described in the patent mentioned above, consists of using fuses. This solution consists of placing a fuse at the input of each unit and protecting each unit against a fault current. In this way, the line connecting the associated unit to the short circuit is cut. Therefore, the fault does not propagate.

This solution is limited to protecting the unit itself without concern for the location of the power distribution point. This solution does not take into account the location of the fault, and does not protect the electrical hardware located upstream from the fuse. The solution of the prior art does not anticipate the possibility of an electrical fault between the fuse and the power distribution point.

Furthermore, the irreversibility of the functioning of a fuse in response to a short circuit also poses another problem. Fuses are known for being integral with the circuit. If a short circuit occurs, and if, for example, the fuse is installed on an interconnect card, as described in the above-mentioned patent, the repair involves replacing not only the fuse but also in some cases the interconnect card and the associated connectors. In this case, a repair costs a lot of money.

Another problem is that the fault current can have several sources. The fuses will be tripped as long as the sources of this current are not all under control.

Moreover, fuses are calibrated for a certain intensity. It is known that fuses are tripped beyond this level of intensity. Another drawback is that they induce a non-negligible voltage drop in the system.

Added to these drawbacks is the fact that a restart of the system is necessary. This is comprised, first of all, of locating the unit associated with the short circuit, and of replacing the unit by removing it from its drawer. This system restart results in a down time for the system and is therefore costly in terms of time.

For the sake of simplicity, the term "controller unit" will be used to designate a controller. In addition, the term "unit" may be used to designate a disk unit or a controller (or adapter).

SUMMARY OF THE INVENTION

A first object of the invention is to provide an optimal availability of the system by protecting the system against an electrical fault, no matter what the location or position of the electrical fault within the system.

A second intended object is a rapid detection of an excessively intense fault current.

A third intended object is to allow a quick restart of the system, and hence an optimal availability of this system.

A fourth intended object is the considerable reduction of maintenance costs.

A fifth intended object is the ease of use of the protection device.

To this end, the subject of the invention is a process for protecting a multidisk storage system equipped with a redundancy mechanism, said system comprising at least two disk units, at least one redundancy control unit, and an electric power distribution point, each unit being connected to the distribution point by means of an electrical line, characterized in that it is comprised of protecting the electrical line associated with a unit in proximity to the power distribution point.

This results in a device for protecting a multidisk storage system equipped with a redundancy mechanism, said system comprising at least two disk units, at least one redundancy control unit, and an electric power distribution point connected to an electric power source, each unit being connected to the distribution point by means of an electrical line, characterized in that each electrical line comprises, in proximity to the power distribution point, a control unit for triggering the opening of the corresponding line.

Another subject of the invention is a multidisk system equipped with a protection device, characterized in that the device uses the process and/or is the device defined above.

The invention will be better understood by reading the following description, given as an example and in reference to the appended drawings.

DETAILED DESCRIPTION OF EXAMPLES ILLUSTRATING THE INVENTION

Figure 1:
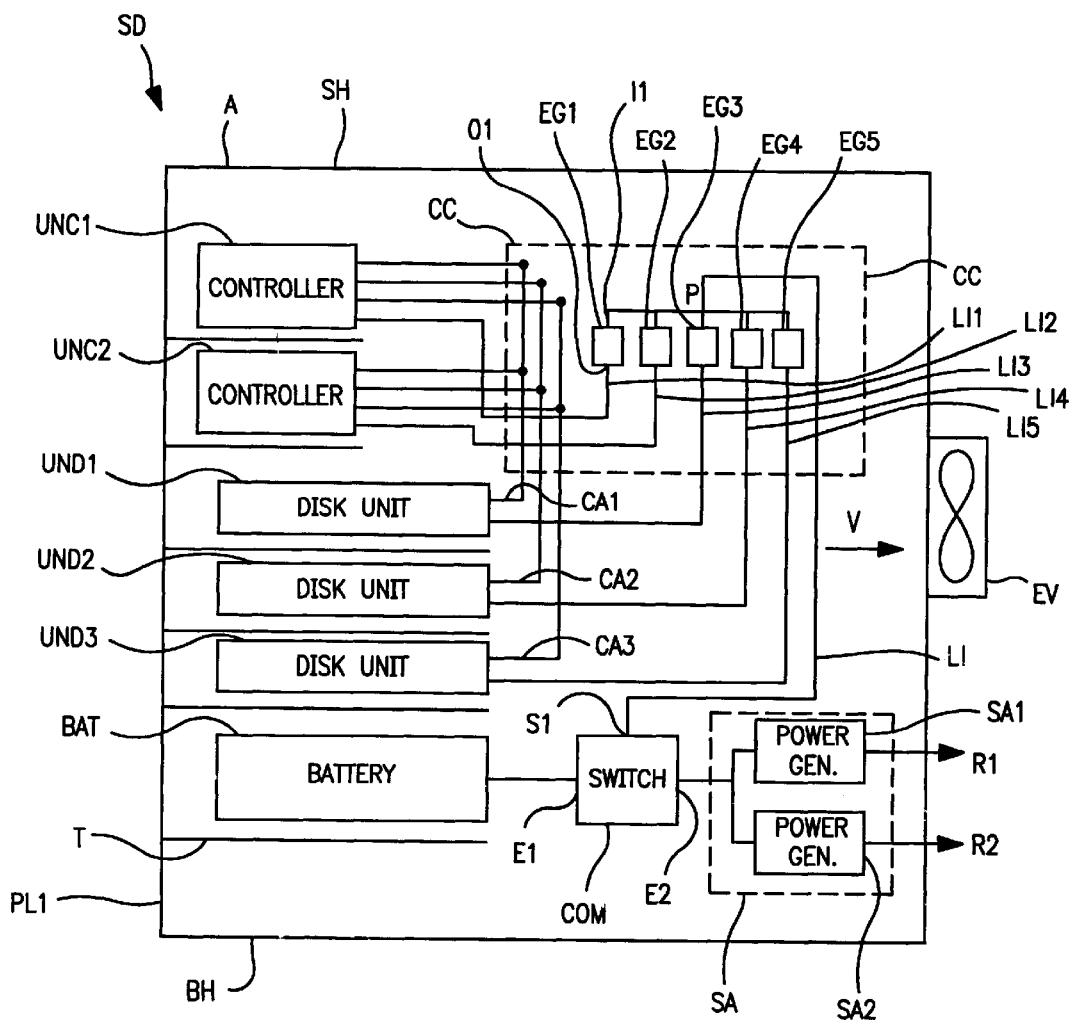
FIG. 1 is a synoptic sectional view of a multidisk system equipped with a protection device according to the invention.

To simplify the description, the same elements illustrated in the drawings will have the same references.

FIG. 1 represents a synoptic view of a multidisk data storage system SD. This system SD is contained in a cabinet A. This cabinet A can have any form. In the example illustrated, this cabinet A has a parallelepipedic shape comprising four vertical lateral walls PL, a horizontal top wall SH, and a horizontal base BH.

The system SD is equipped with a redundancy mechanism provided by a redundancy control unit. In some systems, at least one controller unit of the RAID type, as defined in the preamble, is used for this purpose. In other systems, it is preferred to use an adapter unit. In the latter case, the adapter unit is responsible for connecting the disk units to one or more host or central processors. In the remainder of the description, a controller unit will be used as example. In the example illustrated, the cabinet comprises two controller units UNC1 and UNC2 operating redundantly. This redundancy means that in case of a failure of one of the two controllers, the second ensures the operation of the system SD without interruption. The system SC comprises at least two disk units. The number of disk units in a multidisk data storage system depends on the type of redundancy used. In the example illustrated, three disk units UND1, UND2 and UND3 are represented. This number is not characteristic of any type of redundancy and is given only as an example. Each unit is contained in an associated drawer T. Preferably, the drawers are located on one of the lateral walls PL1 of the cabinet A.

Each of the two controller units UNC1 and UNC2 is connected to the three disk units UND1, UND2 and UND3 by means of three respective cables CA1, CA2 and CA3. The cable CA1 serially connects the two controllers UNC1 and UNC2 to the disk unit UND1. Likewise, the cable CA2 serially connects the two controllers UNC1 and UNC2 to the disk unit UND2. And lastly, the cable CA3 serially connects the two controllers UNC1 and UNC2 to the disk unit UND3. A cable, as mentioned in the preamble of the description, comprises the data path. The data path is a standardized bus, for example of the type known as "Fast/Wide single-ended SCSI." A cable comprises control lines, specifically disk control lines. The cables CA1, CA2 and CA3 are physically distinct from one another. The data paths existing between the controllers and the disk units are therefore independent when it comes to the writing or reading of data on the disks.

The system SD comprises an electric power source SA, a battery BAT and a switch COM. The switch COM comprises two inputs E1 and E2, and one output S. The assembly illustrated, constituted by the electric power source SA, the switch COM and the battery COM, is near the horizontal base BH.

The switch COM has its input E1 connected to the battery BAT and its input E2 connected to the electric power source SA. This means that if the power source SA is interrupted, it is the battery BAT that continues to ensure the electric power supply. The output S of this switch is connected to a line LI. This line LI comprises a live line and a ground line. This line LI is divided at a power distribution point P into a number of lines equal to the number of units in the system SD. A power distribution point P is defined as being the starting point for the distribution of the electric power supply. In the example illustrated, the line LI is divided into five electrical lines, respectively LI1, LI2, LI3, LI4, LI5, which are connected to the respective units UNC1, UNC2, UND1, UND2 and UND3. In addition, the system comprises an interconnect card CC. This card CC provides a better layout for the connections, in the cabinet A, between the disk units UND1–UND3 and the controller units UNC1 and UNC2.

And finally, the system SD comprises a fan unit EV. This fan unit EV is located on one of the lateral walls and creates an air flow inside the cabinet. Preferably, this fan unit EV is located on a lateral wall PL2 opposite the lateral wall PL1. Openings are provided both in the wall PL1 and in the units themselves. An air flow is therefore created inside the cabinet A. The direction of the flow in the cabinet A is represented by an arrow V in FIG. 1.

A system of this type has a problem when an electrical fault occurs in the system SD. A short circuit can occur in a unit but also in one of the lines LI1–LI5 that connect the units UNC1, UNC2, UND1, UND2 and UND3, respectively, to the distribution point P. This situation, as mentioned in the introduction, creates a fault current having serious consequences in the system SD in terms of availability.

The protection process is comprised of protecting the electrical line LI1–LI5 associated with a unit in proximity to the distribution point P. The process is comprised of automatically disconnecting the electrical line LI1–LI5 between the respective unit UNC1, UNC2, UND1, UND2 and UND3 and the power distribution point P when an electrical fault occurs in the unit associated with the fault or in the electrical line itself, and then of automatically reconnecting the electrical line after this fault disappears.

The protection device according to the invention comprises, on each electrical line (LI1–LI5), in proximity to the power distribution point (P), a control unit (EG1–EG5) for triggering the opening of the corresponding line (LI1–LI5). In addition, the control unit (EG1–EG5) controls the automatic closing of the corresponding line (LI1–LI5). Each unit EG1–EG5 has a respective input I1–I5 and a respective output O1–O5. For purposes of clarity, only the input I1 and the output O1 associated with the control unit EG1 are represented in FIG. 1. Each input I1–I5 is connected to a unit, respectively UNC1, UNC2, UND1, UND2 and UND3. All of the outputs O1–O5 are connected to the power distribution point P. The control units EG1–EG5 automatically control the opening and the closing of the corresponding lines LI1–LI5 associated with them, not only when an electrical fault, in this case a short circuit, occurs in the corresponding unit UNC1–UNC2 and UND1–UND3, but also when an electrical fault occurs in the associated line LI1–LI5 that connects this unit to the power distribution point P. The control unit EG1–EG5 therefore detects the fault current in the associated line LI1–LI5. A fault current is defined as having an intensity of current higher than that of the normal operating condition. Likewise, a normal operating condition is characterized by a range that includes the intensity values of the current. Beyond this range, the current is a fault current. The control unit located in proximity to the power distribution point P allows the various units UNC1–UNC2 and UND1–UND3 to be independent of one another with respect to an electrical fault. The location of the control unit therefore optimally protects a unit UNC1–UNC2 and UND1–UND3 and the corresponding electrical line LI1–LI5.

According to another characteristic of the invention, the probability of an electrical fault upstream from the power distribution point P has to be null. In the example illustrated, the system SD comprises at least two lines LI connected redundantly. Moreover, the line LI is in a protected environment, inaccessible by an operator. The probability (in the mathematical sense of the term) of an electrical fault in the line LI, which connects the output of the switch COM to the power distribution point P, is therefore practically null. The line LI connects the output S of the switch COM to the interconnect card CC. The power distribution point P is located on the interconnect card CC. In another example, the point P can be located in proximity to the power source SA. The line LI can therefore be compared to a connection point. It is obvious, in this last example, that an electrical fault cannot occur between the point P and the power source SA.

In the example illustrated, the control units EG1–EG5 are located on the interconnect card CC. The interconnect card is located in proximity to the horizontal top wall SH. Moreover, the perpendicular to the plane of the interconnect card CC has a direction perpendicular to the direction of the air flow in the cabinet. The placement of this card CC in this way makes it possible to leave an empty space EV between the fans V and the units. This results in better ventilation and a better passage of the air in the cabinet A through the openings located on the side PL1 on which the units are installed and over the units themselves UNC1–UNC2 and UND1–UND3. An air flow is therefore easily created in the cabinet A.

The electric power source SA comprises at least one electric power generator. In the example illustrated, the source SA comprises two power generators SA1 and SA2. The two generators SA1 and SA2 are connected in parallel and operate redundantly. These two generators are connected to the input E2 of the switch COM. In addition, each electric power generator SA1 and SA2 is connected to a distribution network. In the example illustrated, the power generators SA1 and SA2 are connected to two respective distribution networks R1 and R2 that are independent of one another. This architecture protects the system SC against a failure of one electric power generator, for example SA1. In such a situation, the second power generator SA2 supplies the system with power. This redundancy of the generators improves the security of the system in terms of availability.

Figure 2:
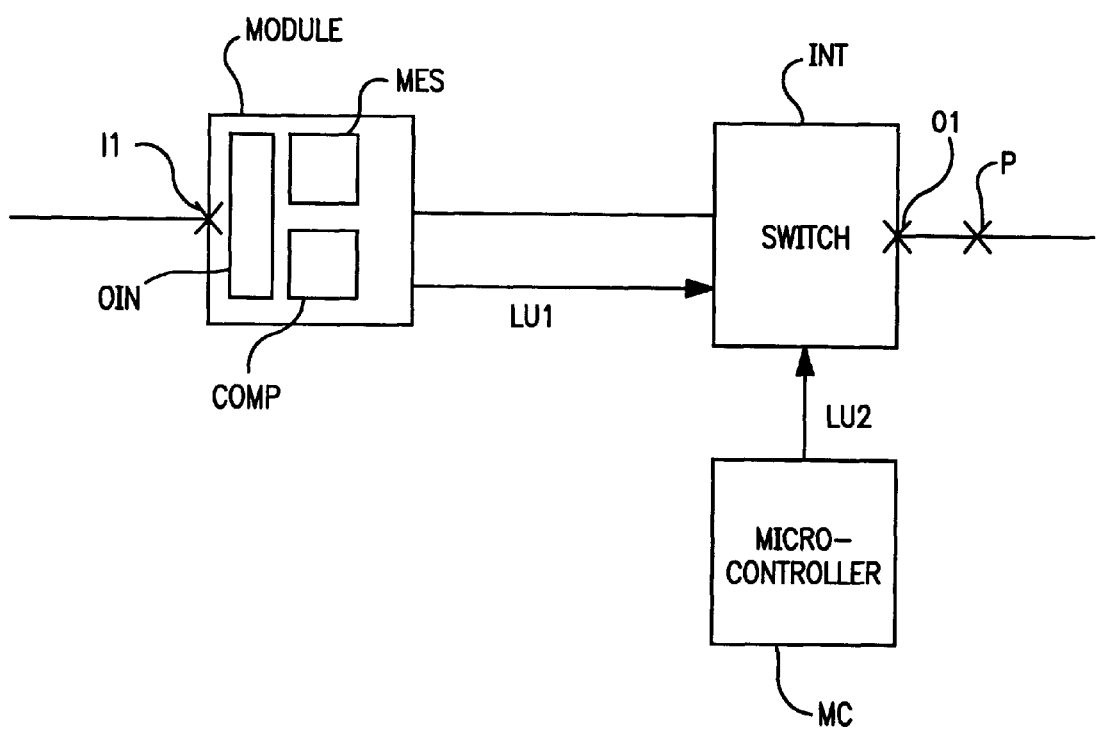
FIG. 2 is a partial schematic view illustrating a control unit EG represented in FIG. 1.

The following is a description, with reference to FIGS. 1 and 2, of one embodiment according to the present invention. FIG. 2 represents a schematic and detailed view of a protection unit, for example EG1.

In the example illustrated, the control unit EG1 is a circuit breaker that resets automatically. In this figure, the input I1 and the output O1 of the circuit breaker are shown. This circuit breaker comprises a module MOD which includes a tool MES for measuring the intensity of a current and tool COMP for comparing this current to a reference value. The circuit breaker comprises a switch INT and a microcontroller MC. The module MOD and the switch INT each have one input and one output.

In this example, the input I1 of the unit EG1 corresponds to the input of the module MOD for measuring the current. The output of the module MOD is connected to the input of the switch INT and the output O1 of the switch INT is connected to the electric power distribution point P. According to the invention, the output O1 of the switch INT is located in proximity to the power distribution point P. A one-way control line LU1 connects the module MOD to the switch INT. This line controls the opening of the switch INT. And finally, a one-way line LU2 connects the microcontroller to the switch INT, for the purpose of transmitting a control signal to the switch.

The module MOD constantly measures the current flowing through the electrical line LI1 associated with the disk unit UND1 and detects a fault current in the line LI1. The module MOD then compares this value to a predefined reference value. This reference value is characteristic of a normal operation of the unit UND1 and of the associated electrical line LI1. During a normal operation of the system SD, the microcontroller MC controls the closing of the switch INT through the control line LU2. As a result of an electrical fault in the unit UND1 or in the associated line LI1, the module MOD detects an excessively intense current. The module MOD controls the opening, through the line LU1, of the switch INT. After the opening of the switch, the microcontroller periodically attempts to re-close the switch INT automatically, and thus tries to restore the connection between the power supply and the unit UND1. New measurements and comparisons are made by means of the module MOD during each reset attempt. If the electrical fault has disappeared, the control signal issued from the module MOD is discontinued and the closure of the switch INT is sustained. The circuit breaker is therefore reset automatically. If the electrical fault subsists, the switch INT remains open, and the unit UND1 is disconnected from the power supply SA.

In another example, the module MOD includes a supplementary module. In a multidisk system, current surges can occur. These current surges are not due to an electrical fault in a unit or in the associated line. These surges are inevitable in an electrical system, for example during the system startup. A current surge is a short pulse. In order to prevent the switch from being tripped as a result of a current surge, which is a pulse that is relatively short and intense enough to be detected by the module MOD, it is necessary to equip the module MOD with an integration tool OIN (in the mathematical sense of the term). The function of this tool OIN is to transform the current surge into a current of more or less constant intensity. Once transformed into a more or less constant value, this surge current is measured and compared by means of the module MOD to a reference value, as described above. The rest of the operation remains identical to that explained in the preceding paragraph.

Thus, the disconnection and the reconnection of the line LI1 are controlled automatically. Therefore, the corresponding disk unit UND1 as well as the associated electrical line LI1 are protected against a fault current.

In another example, the unit EG is a component that is tripped and reset automatically. This type of component is capable of creating a substantial variation in its resistance as a function of the temperature or the intensity carried in the electrical line. Normally several milliohms during a normal operation of the disk or controller unit, the resistance of this component increases enough to limit the current to several milliamperes. The associated unit, in case of a fault, will be disconnected from the distribution point and from the other units. The line is therefore disconnected from the distribution point P. After the repair of the unit and the resulting disappearance of the fault current, the used component returns to its normal state and its resistance lowers. Thus, if the fault has a plurality of sources, the fuse will return to its normal state once all the faults have disappeared. Once the original resistance, namely several milliohms, has returned, the electrical line is reconnected to the rest of the system. This type of protection has a certain reaction time and is not suitable for use in all cases.

Generally, it may be said that the subject of the invention is a protection process for a multidisk storage system SD equipped with a redundancy mechanism, said system comprising at least two disk units UND1–UND3, at least one redundancy control unit UNC1–UNC2, and an electric power distribution point P, each unit UND1–UND3 and UNC1–UNC2 being connected to the distribution point P by means of an electrical line, respectively LI1–LI5. The process according to the invention is comprised of protecting the electrical line associated with each unit in proximity to the distribution point P. The process is comprised of automatically disconnecting the electrical line LI1–LI5 between a unit and the power distribution point P when an electrical fault occurs in the unit associated with the fault or in the line itself, and then of automatically reconnecting this electrical line LI1–LI5 after the disappearance of this fault.

This results in a protection device wherein each electrical line LI1–LI5 comprises, in proximity to the power distribution point P, a control unit EG1–EG5 for triggering the opening of the corresponding line LI1–LI5.

In the example illustrated in FIG. 2, the control unit EG can be a circuit breaker. It has been seen that the control unit EG1–EG5 includes a module MOD for measuring a current and detecting a fault current in the respective line LI1–LI5. A fault current has an intensity of current higher than that of the normal operating condition. As the description shows, the control unit EG1–EG5 comprises a micro-controller MC for automatically controlling the closing of a switch INT on the respective line LI1–LI5 and periodically attempting to restore the power supply in the associated unit UND1–UND3 and UNC1–UNC2. It has also been seen that the system SD can include an integration tool (OIN) in the mathematical sense of the term) for transforming a current surge into a current of more or less constant intensity.

As is also clear from the description, the control unit can be a component capable of creating a substantial variation in its resistance as a function of the intensity of the current flowing through an electrical line.

It has also been seen that the electric power source SA comprises at least two power generators (SA1, SA2) connected in parallel and that each generator is connected to a respective distribution network (R1) and (R2), each of which is independent of the other.

It is also clear from the description that the invention provides a number of advantages. It provides the data storage system with an optimal availability of the data, while protecting one of the main elements of redundancy, namely the data path. It solves the problem of a fault current produced as a result of a short circuit. No matter what the location of the electrical fault within the system, the fault current that results from it will not be propagated past the power distribution point P. Another advantage of the invention is that it protects not only the units but also the cable associated with these units. Therefore, the units are no longer dependent with respect to the electrical fault. Another advantage is that it allows a fast restart of the system, using a control unit that can be reset automatically. This characteristic makes it possible to reduce maintenance costs considerably. It is not necessary to replace a circuit breaker each time a short circuit occurs in the system. And lastly, a final advantage of the invention is the ease of use of the protection device, as well as the low cost of its production and assembly.

While the preferred forms and embodiments of the invention have been illustrated and described, it will be apparent to those of ordinary skill in the art that various changes and modifications may be made without deviating from the inventive concept and spirit of the invention as set forth above, and it is intended by the appended claims to define all such concepts which come within the full scope and true spirit of the invention.

What is claimed is:

1. A process for protecting a multidisk storage system (SD) including a redundancy mechanism, said storage system comprising at least two disk units (UND1–UND3), at least one redundancy control unit (UNC1, UNC2), and an electric power distribution point P, each redundancy control and disk unit (UND1–UND3 and UNC1–UNC2) being connected to the distribution point (P) by means of a respective electrical line (LI1–LI5), characterized in that said process comprises protecting the electrical line associated with a unit in proximity to the distribution point P.

2. The process according to claim 1, characterized in that it further comprises automatically disconnecting the associated electrical line (LI1–LI5) between the unit and the distribution point P when an electrical fault occurs either in the unit associated with the disconnected line or in the associated electrical line, and then automatically reconnecting the disconnected electrical line (LI1–LI5) after the disappearance of the electrical fault.

3. A device for protecting a multidisk storage system (SD) including a redundancy mechanism, said system comprising at least two disk units (UND1–UND3), at least one redundancy control unit (UNC1, UNC2), and an electric power distribution point (P) connected to an electric power source (SA), each redundancy and disk unit (UND1–UND3, UNC1–UNC2) being connected to the distribution point (P) by means of a respective electrical line (LI1–LI5), each electrical line (LI1–LI5) comprises, in proximity to the power distribution point (P), a control unit (EG1–EG5) for triggering the opening of an electrical line (LI1–LI5) upon a fault.

4. The device according to claim 3, characterized in that the control unit (EG1–EG5) controls the automatic closing of the corresponding line (LI1–LI5).

5. The device according to claim 3, characterized in that the control unit (EG1–EG5) includes a module MOD for measuring current in each line and detecting fault currents in the respective lines (LI1–LI5).

6. The device according to claim 3, characterized in that the control unit (EG1–EG5) comprises a microcontroller MC for automatically controlling the closing of a switch (INT) on the respective open line (LI1–LI5), and periodically attempting to restore power to the associated power distribution point P and the disk and redundancy control units (UND1–UND3, UNC1–UNC2).

7. The device according to claim 3, characterized in that the control unit opens the corresponding electrical line in response to a fault current having an intensity of current higher than that of the normal operating condition.

8. The device according to claim 3, characterized in that the electrical line LI is disposed in a protected environment, inaccessible by an operator.

9. The device according to claim 3, characterized in that the line LI is a connection point.

10. The device according to claim 4, characterized in that the control unit (EG1–EG5) comprises a microcontroller MC for automatically controlling the closing of a switch (INT) on the respective open line (LI1–LI5), and periodically attempting to restore power to the associated power distribution point P and the disk and redundancy control units (UND1–UND3, UNC1–UNC2).

11. The device according to claim 5, characterized in that the control unit (EG1–EG5) comprises a microcontroller MC for automatically controlling the closing of a switch (INT) on the respective open line (LI1–LI5), and periodically attempting to restore power to the associated power distribution point P and the disk and redundancy control units (UND1–UND3, UNC1–UNC2).

12. The device according to claim 4, characterized in that the control unit opens the corresponding electrical line in response to a fault current having an intensity of current higher than that of the normal operating condition.

13. The device according to claim 5, characterized in that the control unit opens the corresponding electrical line in response to a fault current having an intensity of current higher than that of the normal operating condition.

14. The device according to claim 6, characterized in that the control unit opens the corresponding electrical line in response to a fault current having an intensity of current higher than that of the normal operating condition.

15. The device according to claim 4 characterized in that the electrical line LI is disposed in a protected environment, inaccessible by an operator.

16. The device according to claim 5 characterized in that the electrical line LI is disposed in a protected environment, inaccessible by an operator.

17. The device according to claim 4, characterized in that the line LI is a connection point.

18. The device according to claim 5, characterized in that the line LI is a connection point.

19. A data storage system having a multidisk storage system, said system including a redundancy mechanism, a protection device, at least two disk units (UND1–UND3), at least one redundancy control unit (UNC1, UNC2), and individual electrical lines (LI1–LI5) connecting each redundancy control unit and each disk unit to a distribution point (P), means for detecting a fault in the respective electrical lines and protecting the electrical line associated with the fault said means for detecting and protecting including upon detection of a fault in the corresponding electrical line or associated unit.

20. A process for protecting a multidisk storage system (SD) including a redundancy mechanism, said storage system comprising at least two disk units (UND1–UND3), at least one redundancy control unit (UNC1, UNC2), and an electric power distribution point P, each redundancy control and disk unit (UND1–UND3 and UNC1–UNC2) being connected to the power distribution point (P) by means of a respective electrical line (LI1–LI5), characterized in that it comprises protecting the electrical line associated with a unit in proximity to the distribution point P by monitoring each line for detecting of a fault therein and disconnecting the line from the power distribution unit upon detection of a fault.

21. The process according to claim 20, characterized in that it further comprises automatically disconnecting the electrical line (LI1–LI5) between a unit and the point P when an electrical fault occurs in the unit associated with the fault or in the electrical line itself, and then automatically reconnecting the electrical line (LI1–LI5) after the disappearance of the electrical fault.

22. The process for protecting a multidisk storage system (SD) according to claim 21, further including after disconnection of a line in response to a detected fault periodically attempting to restore the connection of the disconnected line to the power distribution point.

* * * * *

UNITED STATES PATENT AND TRADEMARK OFFICE
CERTIFICATE OF CORRECTION

PATENT NO.     : 6,295,609 B1
DATED          : September 25, 2001
INVENTOR(S)    : Cargemel et al.

It is certified that error appears in the above-identified patent and that said Letters Patent is hereby corrected as shown below:

<u>Title page,</u>
In the list of inventors, delete "Michaud Gilbert" and substitute -- Gilbert Michaud --;

Signed and Sealed this

Second Day of April, 2002

*Attest:*

*Attesting Officer*

JAMES E. ROGAN
*Director of the United States Patent and Trademark Office*